(12) United States Patent
Yu et al.

(10) Patent No.: US 9,031,361 B2
(45) Date of Patent: May 12, 2015

(54) OPTICAL MODULE

(71) Applicant: Hitachi Cable, Ltd., Tokyo (JP)

(72) Inventors: Juhyun Yu, Mito (JP); Hiroki Yasuda, Mito (JP); Kouki Hirano, Hitachinaka (JP); Yoshinori Sunaga, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 106 days.

(21) Appl. No.: 13/748,446

(22) Filed: Jan. 23, 2013

(65) Prior Publication Data

US 2013/0216179 A1  Aug. 22, 2013

(30) Foreign Application Priority Data

Jan. 27, 2012  (JP) ................................. 2012-015823

(51) Int. Cl.
 *G02B 6/12* (2006.01)
(52) U.S. Cl.
 CPC ........................................ *G02B 6/12* (2013.01)
 USPC .................................. 385/14; 385/16; 385/2
(58) Field of Classification Search
 USPC ................................................ 385/14, 16, 2
 See application file for complete search history.

(56) References Cited

U.S. PATENT DOCUMENTS

| | | | |
|---|---|---|---|
| 6,038,203 A * | 3/2000 | Tajiri et al. ................. | 369/112.1 |
| 6,766,082 B2 | 7/2004 | Hirabayashi et al. | |
| 7,078,728 B2 * | 7/2006 | Ishii et al. ....................... | 257/79 |
| 7,590,315 B2 | 9/2009 | Okubo et al. | |
| 2002/0076161 A1 | 6/2002 | Hirabayashi et al. | |
| 2005/0023538 A1 * | 2/2005 | Ishii et al. ....................... | 257/79 |
| 2008/0043171 A1 * | 2/2008 | Takahashi et al. .............. | 349/65 |
| 2008/0138007 A1 | 6/2008 | Okubo et al. | |
| 2011/0175533 A1 * | 7/2011 | Holman et al. ................ | 315/130 |
| 2011/0249947 A1 * | 10/2011 | Wang et al. ..................... | 385/89 |
| 2012/0050634 A1 * | 3/2012 | Kim et al. ........................ | 349/58 |
| 2012/0189244 A1 * | 7/2012 | Bowen et al. ................... | 385/14 |
| 2012/0189245 A1 * | 7/2012 | Bowen et al. ................... | 385/14 |

FOREIGN PATENT DOCUMENTS

| | | |
|---|---|---|
| JP | 06-075137 A | 3/1994 |
| JP | 2003-140101 A | 5/2003 |

(Continued)

OTHER PUBLICATIONS

Japanese Office Action dated Feb. 24, 2015 with an English translation.

*Primary Examiner* — Kaveh Kianni
(74) *Attorney, Agent, or Firm* — McGinn IP Law Group, PLLC

(57) ABSTRACT

An optical module has a circuit board, a photoelectric conversion element mounted on a mount surface of the circuit board, an optical coupling member for holding an optical fiber and optically coupling the optical fiber and the photoelectric conversion element, a semiconductor circuit element mounted on the mount surface of the circuit board and electrically connected to the photoelectric conversion element, and a plate-shaped supporting substrate arranged to sandwich the optical coupling member between the supporting substrate and the circuit board. An electrically conductive metal foil which extends in a thickness direction of the supporting substrate is provided integrally with a side surface of the supporting substrate, and the metal foil is connected at one end thereof to an electrode provided on a non-mount surface of the circuit board.

4 Claims, 9 Drawing Sheets

(56) References Cited

FOREIGN PATENT DOCUMENTS

| JP | 2008-145684 A | 6/2008 |
| JP | 2008-256870 A | 10/2008 |
| JP | 2011-095295 A | 5/2011 |

* cited by examiner

FIG.8A  FIG.8B  FIG.8C
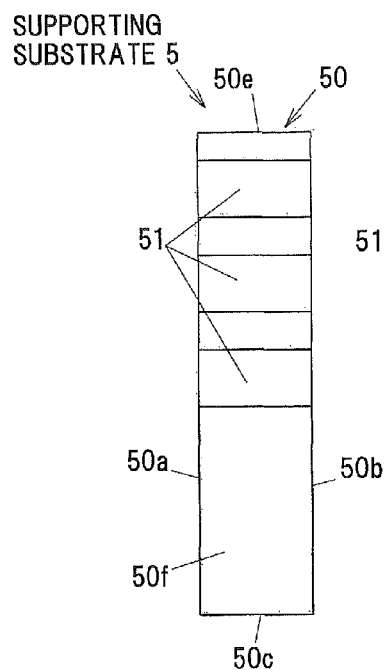
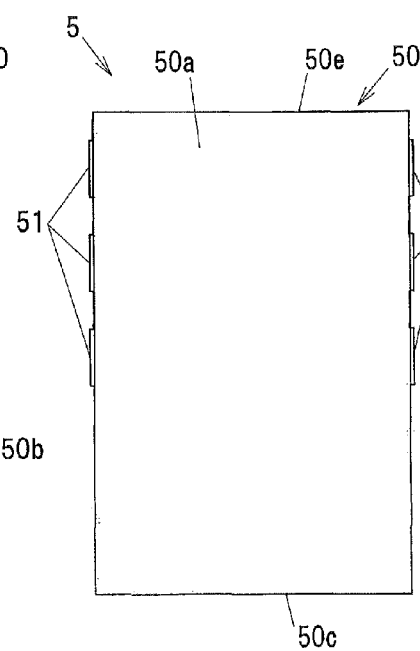
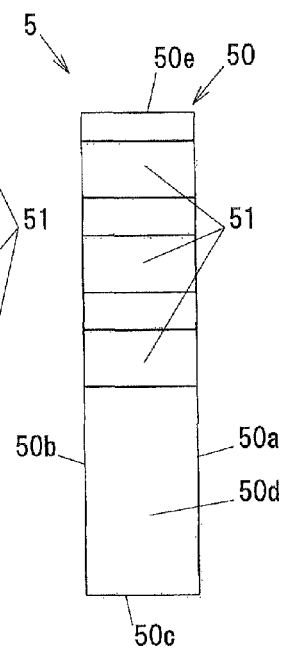
FIG.8D
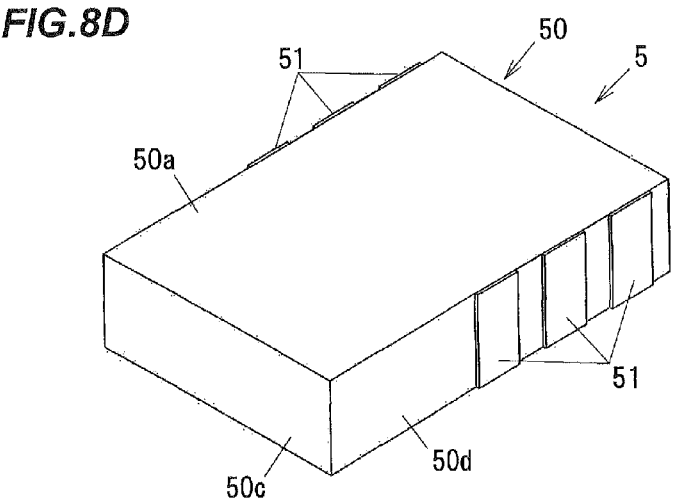

OPTICAL MODULE

The present application is based on Japanese patent application No. 2012-015823 filed on Jan. 27, 2012, the entire contents of which are incorporated herein by reference.

BACKGROUND OF THE INVENTION

1. Field of the Invention

The present invention relates to an optical module, which transmits a signal through an optical fiber.

2. Description of the Related Art

Conventionally, an optical module for transmitting or receiving a signal through an optical fiber which is equipped with a photoelectric conversion element for converting electrical energy into optical energy, or optical energy into electrical energy has been known as disclosed by e.g. Japanese Patent Laid-Open No. 2011-95295 (JP-A-2011-95295).

The optical module disclosed by JP-A-2011-95295 includes plate-shaped first to fourth substrates, an IC substrate, and a connector for electrically connecting the optical module to another circuit device. The first substrate is mounted with a light emitting element or a light receiving element thereon. The IC substrate is provided with a circuit which transmits an electrical signal to the light emitting element, or a circuit that amplifies an electric signal of the light receiving element. The second substrate is provided with an insertion guide groove therein for an optical fiber to be inserted thereinto, so that the optical fiber inserted in the insertion guide groove is sandwiched between the second substrate and the third substrate. The IC substrate is installed in an extension direction of the optical fiber, so as to sandwich the first substrate between the IC substrate and the third substrate. That is, the third substrate, the first substrate, and the IC substrate are arranged in this order in the extension direction of the optical fiber. In addition, the first substrate, the third substrate, and the IC substrate are installed on an upper surface of a fourth substrate larger than each of these substrates and the connector is attached to a lower surface of the fourth substrate.

SUMMARY OF THE INVENTION

In recent years, with widespread use of optical communications, the optical module has been being mounted on various devices. Size and weight reduction of the optical module may then be strongly desired depending on the devices. One example of applications of the optical module is communications between an operating portion (keyboard mounted portion) and a displaying portion (display mounted portion) of a folding or sliding mobile phone.

In the optical module disclosed by JP-A-2011-95295 above, the first substrate and the third substrate are installed on the upper surface of the fourth substrate, and further the second substrate is installed on the third substrate. The optical module therefore has such a structure that the three substrates are stacked on the connector. This leads to an increase in the dimension in the thickness direction of the optical module.

Also, a way to shorten the entire length of the above described optical module (the length in the extension direction of the optical fiber) is considered to be, e.g., to miniaturize the second substrate and the third substrate and shorten the insertion guide groove. However, shortening the insertion guide groove leads to the optical fiber holding rigidity lowering, and the optical fiber tending to slip out from the insertion guide groove. This is a structural constraint on shortening the entire length of the optical module.

Accordingly, it is an object of the present invention to provide an optical module capable of ensuring miniaturization thereof while securely holding an optical fiber.

According to a feature of the invention, an optical module comprises:

a circuit board;

a photoelectric conversion element mounted on a mount surface of the circuit board;

an optical coupling member for holding an optical fiber and optically coupling the optical fiber and the photoelectric conversion element;

a semiconductor circuit element mounted on the mount surface of the circuit board and electrically connected to the photoelectric conversion element; and a plate-shaped supporting substrate arranged to sandwich the optical coupling member between the supporting substrate and the circuit board, in which an electrically conductive metal foil which extends in a thickness direction of the supporting substrate is provided integrally with a side surface of the supporting substrate, and the metal foil is connected at one end thereof to an electrode provided on a non-mount surface of the circuit board.

The supporting substrate may be formed by dicing a rod-shaped base material made of an insulation provided with an electrically conductive metal foil along a center axis at a cross section orthogonal to the center axis together with the metal foil.

The optical coupling member may include a groove which opens to a supporting substrate side to receive a tip of the optical fiber, and the supporting substrate may sandwich the tip of the optical fiber received in the groove between the supporting substrate and the optical coupling member.

The optical coupling member may include a holding body for holding the optical fiber and a light guiding body for guiding light exiting from the optical fiber.

The supporting substrate may have such translucency that the tip of the optical fiber received in the groove is visible from a second plane opposite a first plane facing the optical coupling member.

(Points of the Invention)

The optical module according to the invention allows ensuring miniaturization thereof while securely holding the optical fiber.

BRIEF DESCRIPTION OF TELE DRAWINGS

The preferred embodiments according to the invention will be explained below referring to the drawings, wherein:

FIG. 8A is a left side view showing a supporting substrate;

FIG. 8B is a front view showing the supporting substrate of FIG. 8A;

FIG. 8C is a right side view showing the supporting substrate of FIG. 8A;

FIG. 8D is a perspective view showing the supporting substrate of FIG. 8A; and

DETAILED DESCRIPTION OF THE PREFERRED EMBODIMENT

Embodiment

Below is described one configuration example of an optical module in an embodiment according to the invention, by reference to FIGS. 1 to 9.

Figure 1:
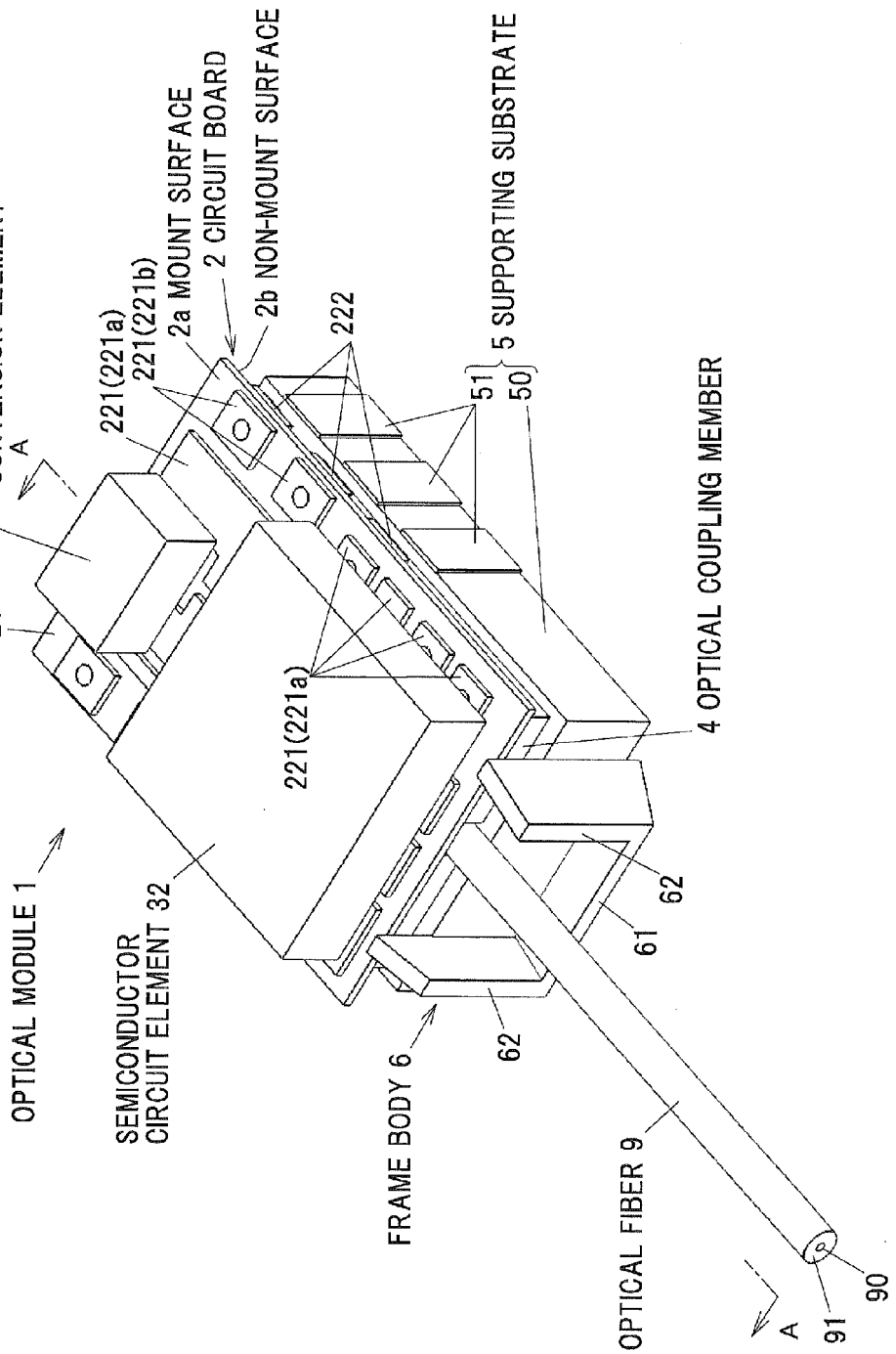
FIG. 1 is a perspective view showing an optical module in the present embodiment.
Figure 2:
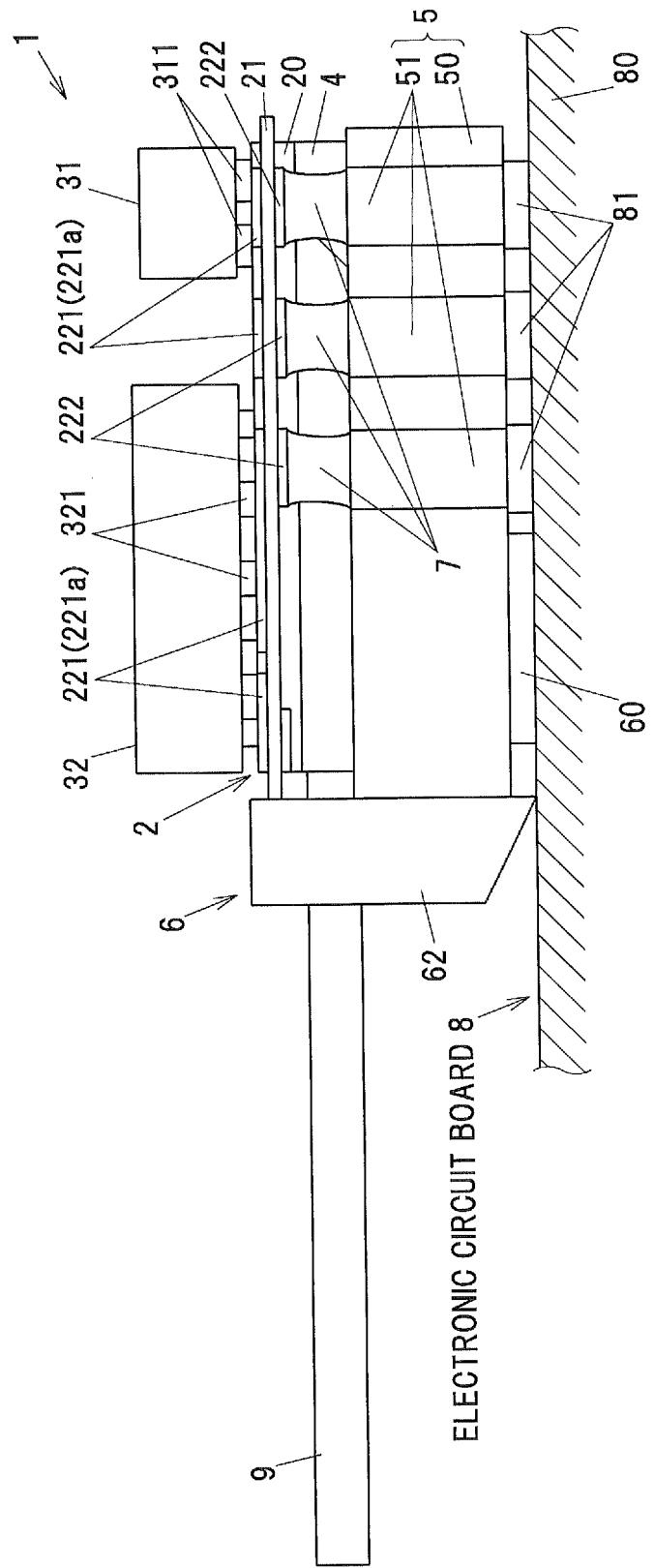
FIG. 2 is a side view showing the optical module mounted on an electronic circuit board.
Figure 3:
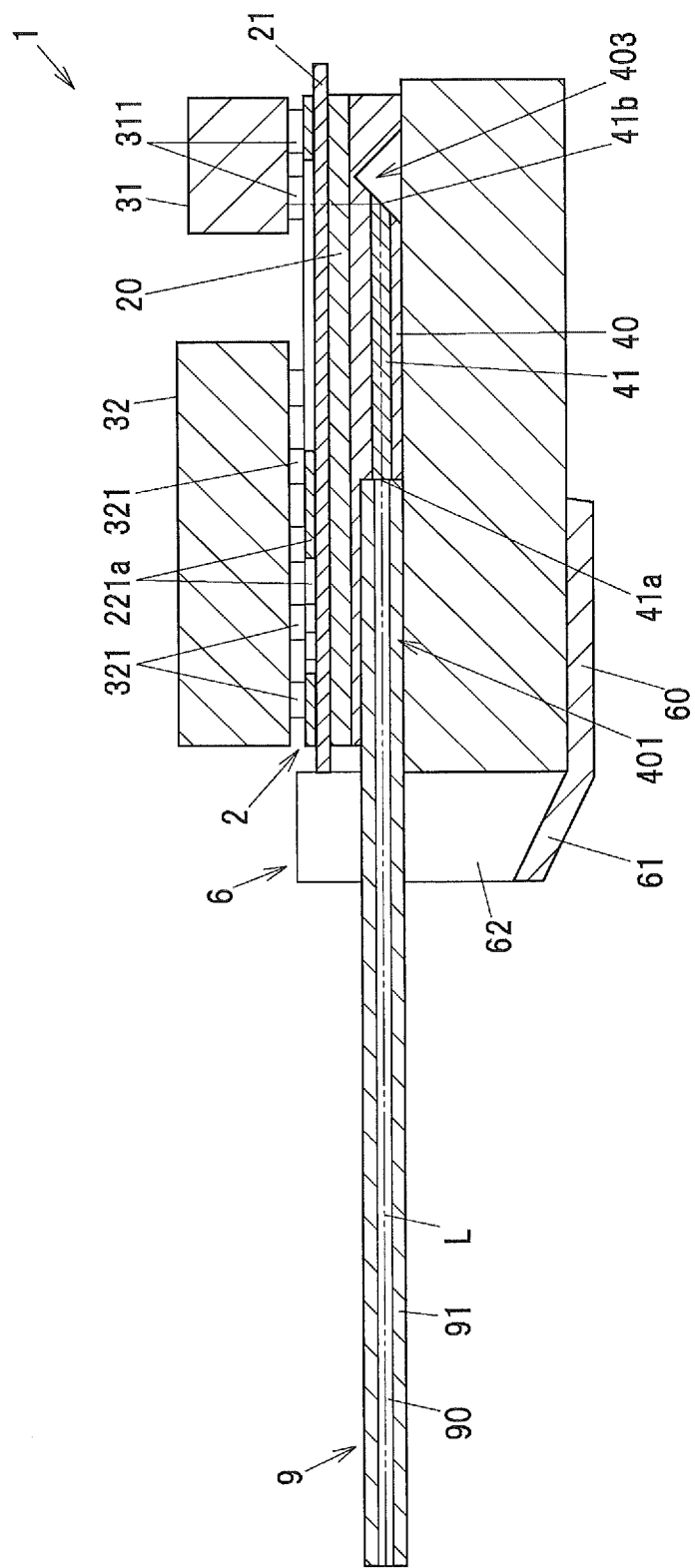
FIG. 3 is a cross sectional view taken along line A-A of FIG. 1.

FIG. 1 is a perspective view showing an optical module 1 in the present embodiment. FIG. 2 is a side view showing the optical module 1 mounted on an electronic circuit board 8. FIG. 3 is a cross sectional view taken along line A-A of FIG. 1 showing the optical module 1 cut along an axis line of an optical fiber 9 mounted to the optical module 1.

As shown in FIG. 2, this optical module 1 is used to be mounted on an electronic circuit board 8. The electronic circuit board 8 is a glass epoxy substrate with a plurality of copper foils 81 stuck to a plate-shaped base material 80. The plate-shaped base material 80 is formed by soaking a glass fiber being with an epoxy resin and thermally curing the soaked glass fiber. The electronic circuit board 8 is mounted with electronic components (not shown) such as a CPU (Central Processing Unit), a memory element and the like. The optical fiber 9 mounted to the optical module 1 is used for optical communications as a transmission medium, to thereby transmit or receive signals between the electronic circuit board 8 and another electronic circuit board or electronic device.

The optical module 1 includes a circuit board 2, a photoelectric conversion element (i.e. electrical to optical or optical to electrical conversion element) 31 mounted on a mount surface 2a of the circuit board 2, an optical coupling member 4 for holding the optical fiber 9 while optically coupling the photoelectric conversion element 31 and the optical fiber 9, a semiconductor circuit element 32 mounted on the mount surface 2a of the circuit board 2, and electrically connected to the photoelectric conversion element 31, and a plate-shaped supporting substrate 5 arranged so as to sandwich the optical coupling member 4 between it and the circuit board 2.

On a side surface of the supporting substrate 5, electrically conductive metal foils 51 which extend in a thickness direction of the supporting substrate 5 are formed integrally with (as one piece with) a body portion 50, and the metal foils 51 are connected to electrodes 222 respectively at one end thereof provided on a non-mount surface 2b of the circuit board 2. As shown in FIG. 2, the metal foils 51 and the electrodes 222 are electrically connected (short-circuited) together by solder 7 not shown in FIG. 1.

Further, in the present embodiment, on a side equipped with an optical coupling member 4 of the circuit board 2, there is provided a coverlay 20 (as shown in FIGS. 2 and 3) made of an insulating resin. The coverlay 20 and the circuit board 2 are fixed together by a fixing means therebetween, such as an adhesive. Likewise, the coverlay 20 and the optical coupling member 4 are fixed together, and the optical coupling member 4 and the supporting substrate 5 are fixed together. In addition, a frame body 6, which is formed by bending a metal such as stainless steel or the like, is fixed to the supporting substrate 5. The frame body 6 is formed so as to surround a periphery of the optical fiber 9 from three directions connected to the optical module 1.

The optical module 1 is, for example 1.3 mm in entire length in an extension direction of the optical fiber 9, and is, for example 1.0 mm in dimension in a width direction orthogonal to this extension direction. In addition, a dimension in a height direction (perpendicular direction to the electronic circuit board 8) of the optical module 1 is, for example 0.8 mm.

The photoelectric conversion element 31 is an element that converts electric energy into light or converts light into electric energy. As an example of the former, there is a semiconductor laser element or an LED (Light Emitting Diode). As an example of the latter, there is a photodiode. The photoelectric conversion element 31 is configured so that light enters or exits from a light receiving or emitting portion not shown which is formed on a surface facing the circuit board 2.

In the case where the photoelectric conversion element 31 is the element that converts electric energy into optical energy, the semiconductor circuit element 32 is a driver IC for driving the photoelectric conversion element 31 based on an electric signal inputted from the electronic circuit board 8. Further, in the case where the photoelectric conversion element 31 is the element that converts optical energy into electrical energy, the semiconductor circuit element 32 is a preamplifier IC which amplifies a signal input from the photoelectric conversion element 31 and outputs that amplified input signal to the electronic circuit board 8.

Incidentally, although in the present embodiment, it is described that there are one photoelectric conversion element 31 and one semiconductor circuit element 32, a plurality of the photoelectric conversion elements 31 and a plurality of the semiconductor circuit elements 32 may be mounted on the circuit board 2.

Figure 4A:
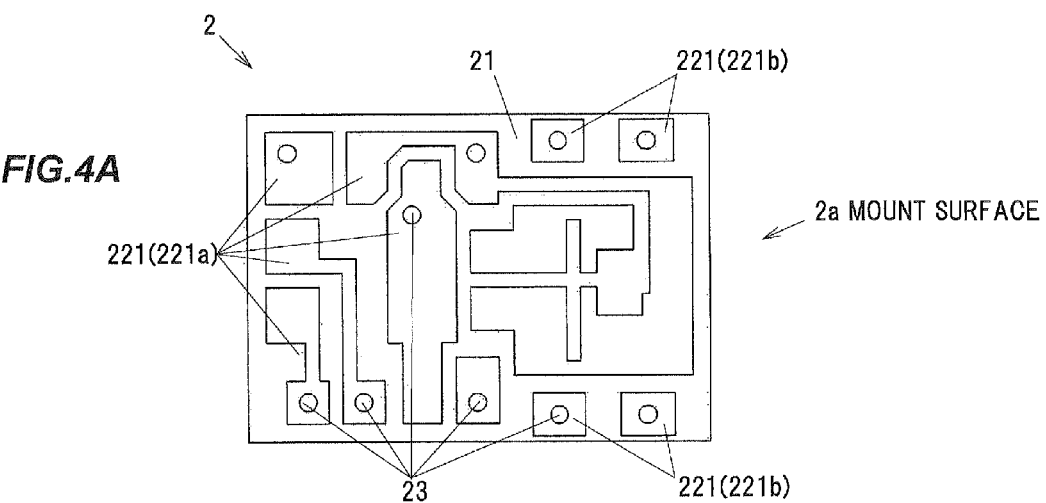
FIG. 4A is a plan view showing a mount surface of a circuit board.
Figure 4B:
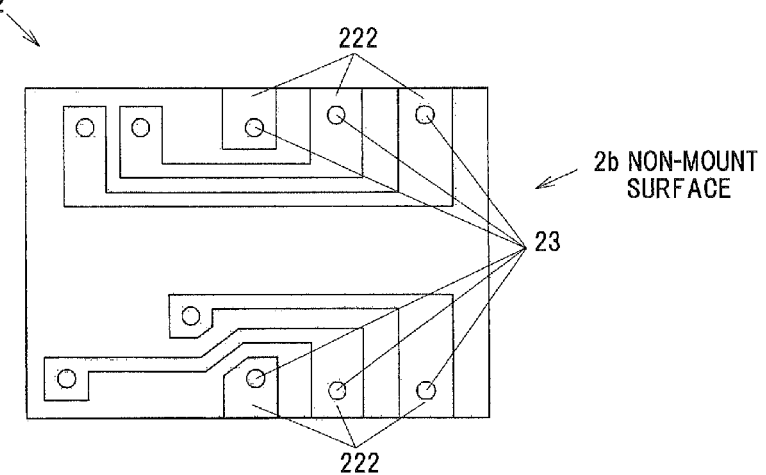
FIG. 4B is a plan view showing of a non-mount surface of the circuit board.

FIG. 4A is a plan view showing the mount surface 2a of the circuit board 2, and FIG. 4B is a plan view showing of the non-mount surface 2b of the circuit board 2.

The circuit board 2 is a flexible substrate with a plurality of electrodes 221 and 222 formed of electrically conductive metal foils provided on surfaces of a base material 21 formed of an insulation film having flexibility and optical transparency. The mount surface 2a mounted with the photoelectric conversion element 31 and the semiconductor circuit element 32 is provided with a plurality of the electrodes 221. The non-mount surface 2b on the back side of the mount surface 2a is provided with a plurality of the electrodes 222.

The metal foils 51 on the supporting substrate 5 are soldered and electrically connected to the plurality of the electrodes 222 respectively. In the optical module 1 in this embodiment, the number of the electrodes 222 and the number of the metal foils 51 are both six. The electrodes 222 are provided on a periphery of the non-mount surface 2b.

The plurality of the electrodes 221 on the mount surface 2a are classified into connecting electrodes 221a and testing electrodes 221b according to functions thereof. The connecting electrodes 221a are electrodes that are connected by soldering to a terminal 311 of the photoelectric conversion element 31 or a terminal 321 of the semiconductor circuit element 32 (see FIGS. 2 and 3).

The testing electrodes 221b are electrodes for testing operation of the optical module 1 alone with the optical module 1 not mounted on the electronic circuit board 8, and are connected by through holes 23 directly to the plurality of the electrodes 222, respectively. An operation testing probe is brought into contact with the testing electrodes 221b, to supply power and input or output the test signal via that probe. In the present embodiment, a plurality (four) of the testing electrodes 221b are arranged around the photoelectric conversion element 31 whose mount area is smaller than that of the semiconductor circuit element 32.

Figure 5A:
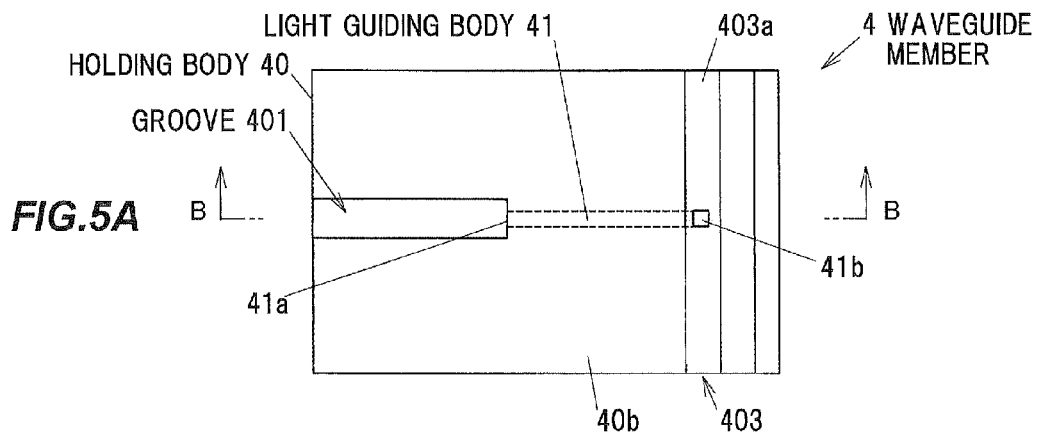
FIG. 5A is a plan view showing an optical coupling member.
Figure 5B:
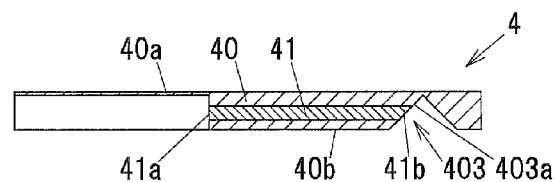
FIG. 5B is a cross sectional view taken along line B-B of FIG. 5A.
Figure 5C:
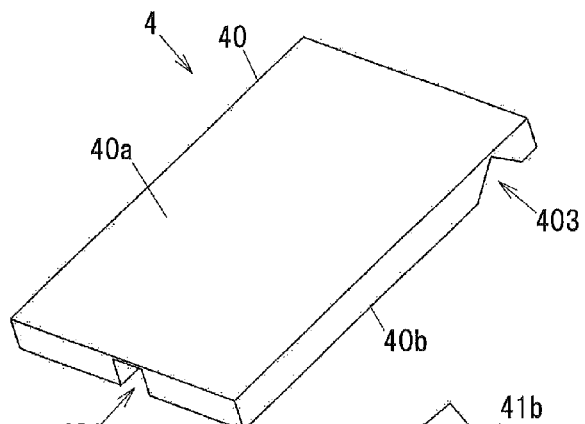
FIGS. 5C and 5D are perspective views, respectively, showing the optical coupling member of FIG. 5A.
Figure 5D:
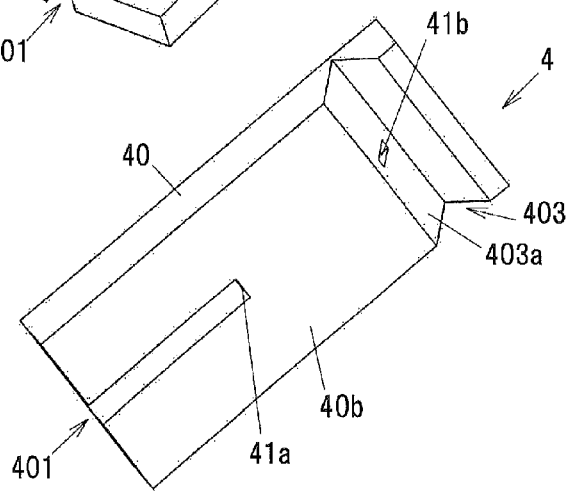

FIG. 5A is a plan view showing the optical coupling member 4, and FIG. 5B is a cross sectional view taken along line B-B of FIG. 5A, and FIGS. 5C and 5D are perspective views, respectively, showing the optical coupling member of FIG. 5A.

The optical coupling member 4 is configured to include a holding body 40 for holding the optical fiber 9, and a light guiding body 41 for guiding light that exits from the optical fiber 9. The holding body 40 and the light guiding body 41 are both translucent at a wavelength of light propagating through the optical fiber 9, and the light guiding body 41 has a refractive index higher than a refractive index of the holding body 40. The holding body 40 is made of, for example a PI (polyimide), and the light guiding body 41 is made of, for example an acryl, epoxy, PI, polysiloxane or the like.

The holding body 40 is shaped into a flat plate, and includes a flat front surface 40a which faces the coverlay 20, and a back surface 40b which is parallel to the front surface 40a and which faces the supporting substrate 5. The holding body 40 includes a groove 401 on the back surface 40b thereof which opens toward the supporting substrate 5 to receive a tip of the optical fiber 9. The groove 401 is formed so as to extend in a direction parallel to the semiconductor circuit element 32 and the photoelectric conversion element 31, and so as to be depressed in a thickness direction of the holding body 40 from the back surface 40b of the holding body 40 toward the front surface 40a.

In addition, the holding body 40 includes the light guiding body 41 which communicates with the groove 401, and which guides light propagating through the optical fiber 9. The center axis of the light guiding body 41 is parallel to the extension direction of the groove 401. In FIG. 5A, the light guiding body 41 is indicated by a broken line.

In addition, the holding body 40 is provided with a notch 403 in the back surface 40b. The notch 403 is formed from one side surface of the holding body 40 to the other side surface thereof, and the extension direction thereof is orthogonal to the center axis of the light guiding body 41. Also, the notch 403 has a triangular shape in side view, and the light guiding body 41 is terminated by a notched surface 403a of the notch 403. The angle between the notch 403 and the back surface 40b is 45 degrees, for example. In addition, the notch 403 may be filled with a resin.

One groove 401 side end of the light guiding body 41 is an entry or exit surface 41a, while an oblique surface thereof terminated by the notched surface 403a of the notch 403 is a reflecting surface 41b. The entry or exit surface 41a is provided to be located to face a core 90 surrounded by a cladding layer 91 (as shown in FIG. 1) of the optical fiber 9 held by the groove 401. The reflecting surface 41b reflects light exiting from the photoelectric conversion element 31 toward the entry or exit surface 41a, or light entering from the entry or exit surface 41a toward the photoelectric conversion element 31.

As shown in FIGS. 2 and 3, the tip of the optical fiber 9 received in the groove 401 of the holding body 40 is sandwiched between the holding body 40 (the bottom of the groove 401) and the supporting substrate 5.

Figure 6:
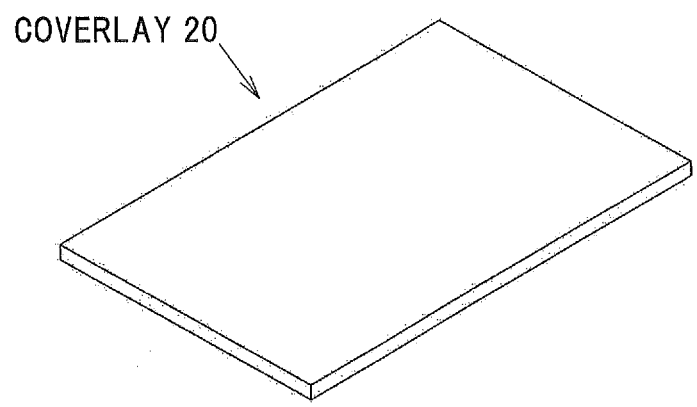
FIG. 6 is a perspective view showing a coverlay.

FIG. 6 is a perspective view showing the coverlay 20.

The coverlay 20 is a flat plate-shaped insulator having optical transparency. The coverlay 20 is made of, for example a PI (polyimide). In addition, the coverlay 20 is formed to have a size and shape to cover the entire front surface 40a of the optical coupling member 4 (the holding body 40). In this embodiment, one plane of the coverlay 20 facing the front surface 40a is congruent with the front surface 40a.

Figure 7:
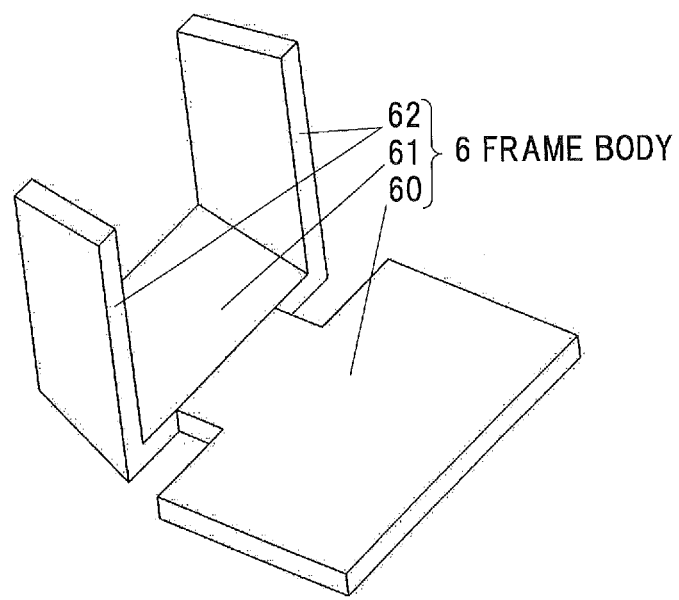
FIG. 7 is a perspective view showing a frame body.

FIG. 7 is a perspective view showing the frame body 6. The frame body 6 integrally includes a flat plate-shaped base 60, a bottom wall 61 adjoining the base 60, and a pair of side walls 62 erected on both ends of the bottom wall 61. The base 60 is fixed by bonding to the back surface 50b of the supporting substrate 5, as described below.

The frame body 6 receives an adhesive not shown in a space between the pair of side walls 62 and pools the adhesive therein until the adhesive solidifies, to fix the optical fiber 9 inserted into the groove 401 of the optical coupling member 4.

FIG. 8A is a left side view showing the supporting substrate 5. FIG. 8B is a front view showing the supporting substrate 5. FIG. 8C is a right side view showing the supporting substrate 5. FIG. 8D is a perspective view showing the supporting substrate 5.

The supporting substrate 5 integrally includes the body portion 50 made of a rectangular parallelepiped insulating material, and a plurality (six) of the metal foils 51 formed on the side surface of the body portion 50. In this embodiment, of the first to fourth side surfaces 50c to 50f of the body portion 50, the second side surface 50d and the fourth side surface 50f parallel to the light guiding body 41 and opposite each other are each provided with the three metal foils 51.

The metal foils 51 are formed so as to extend in the thickness direction of the supporting substrate 5 (in the direction perpendicular to the front surface 50a and the back surface 50b) from an end of the front surface 50a facing the back surface 40b of the optical coupling member 4, to an end of the back surface 50b of the supporting substrate 5.

In this embodiment, the body portion 50 is formed from a glass containing material. More specifically, the body portion 50 is made of a glass epoxy resulting from a glass fiber being soaked with an epoxy resin and thermally cured. In this embodiment, the material of the body portion 50 is a so-called FR 4 (Flame Retardant Type 4). Also, the metal foils 51 are based mainly on copper, and this copper surface is plated with gold.

The body portion 50 is, for example not more than 0.5 mm in thickness, and has such translucency that the tip of the optical fiber 9 received in the groove 401 of the optical coupling member 4 is visible from the back surface 50b (the second plane) opposite the front surface 50a (the first plane).

Figure 9:
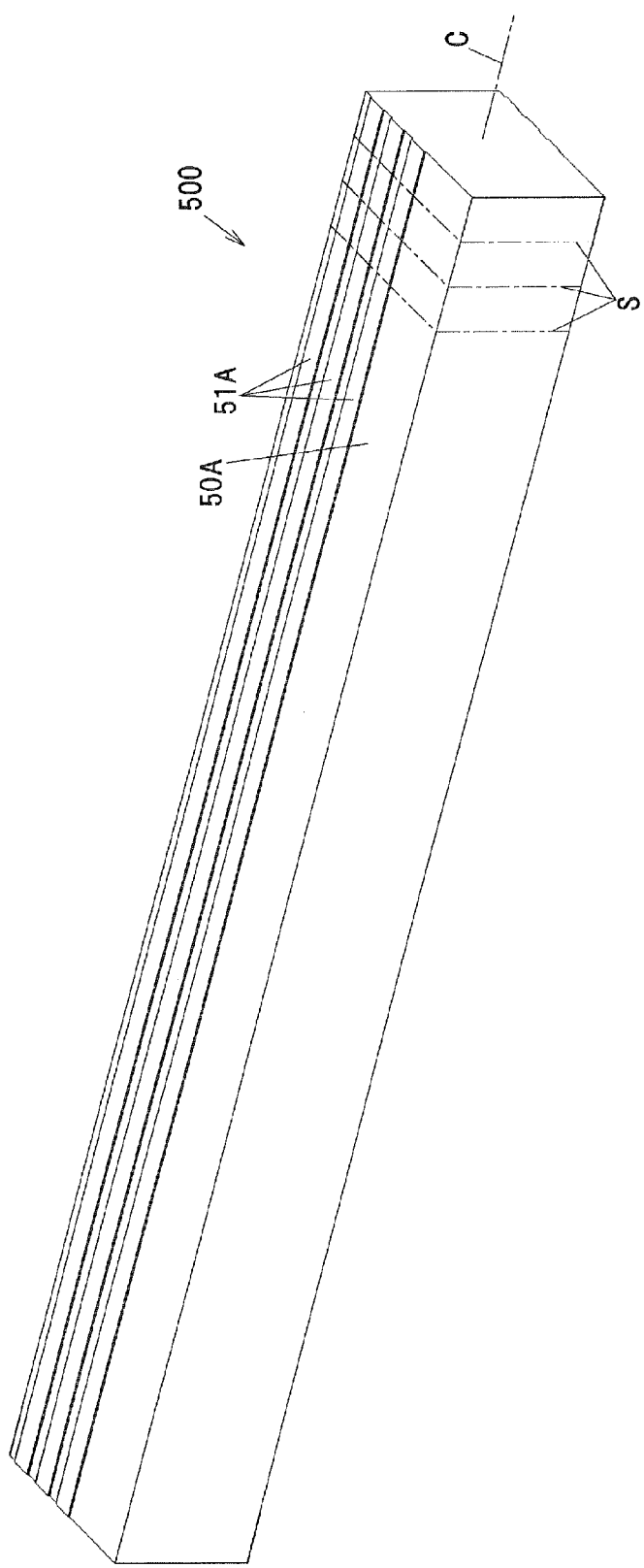
FIG. 9 is a perspective view showing a rod-shaped member which is diced into the supporting substrate.

FIG. 9 is an explanatory diagram showing a fabricating process of the supporting substrate 5, and shows a rod-shaped member 500 prior to being singulated by dicing into a plurality of the supporting substrates 5.

This rod-shaped member 500 integrally includes a base material 50A to form the body portion 50 of the supporting substrate 5, and linear metal foils 51A which are formed on a side surface of the base material 50A along the center axis C of the base material 50A to form the metal foils 51 of the supporting substrate 5.

The rod-shaped member 500 is provided with the metal foils 51A by sticking a thin copper sheet so as to cover the pre-polished side surface of the base material 50A, etching that thin copper sheet so as to fit the shape of the metal foils 51A, and plating that thin copper sheet with gold. In addition, the metal foils 51A may be formed by metallization, for example. Also, the gold plating may be substituted with nickel plating or flux treatment.

The supporting substrate 5 is formed by dicing the rod-shaped base material 50A at a cross section perpendicular to the center axis C thereof together with the metal foils 51A. In FIG. 9 the cutting line S of the rod-shaped member 500 is indicated by a dashed line. That is, the cut surface of the rod-shaped member 500 is the front surface 50a or the back surface 50b of the supporting substrate 5.

(Operation of the Optical Module 1)

Next is described operation of the optical module 1 with reference to FIG. 2. Herein is mainly described the case where the photoelectric conversion element 31 is a VCSEL (Vertical Cavity Surface Emitting LASER), and the semiconductor circuit element 32 is a driver IC to drive this photoelectric conversion element 31.

The optical module 1 operates by operating power being supplied from the electronic circuit board 8. This operating power is input to the photoelectric conversion element 31 and the semiconductor circuit element 32 via the metal foils 51 of supporting substrate 5 and the circuit board 2. In addition, a signal to be transmitted through the optical fiber 9 as the transmission medium is input from the electronic circuit board 8 via the metal foils 51 and the circuit board 2 to the semiconductor circuit element 32. The semiconductor circuit element 32 drives the photoelectric conversion element 31 based on the input signal.

The photoelectric conversion element 31 emits laser light in a direction perpendicular to the mount surface 2a, from the light receiving or emitting portion formed on the surface facing the circuit board 2, toward the mount surface 2a of the circuit board 2. In FIG. 3, the optical path L of the laser light is indicated by a two-dot chain line.

The laser light is transmitted through the base material 21 of the circuit board 2 and the coverlay 20, and enters the optical coupling member 4. The laser light having entered the optical coupling member 4 is reflected off the reflecting surface 41b, is guided to the light guiding body 41 and enters the core 90 of the optical fiber 9 from the entry or exit surface 41a.

In addition, the photoelectric conversion element 31 is a photodiode, for example. When the semiconductor circuit element 32 is a preamplifier IC, the traveling direction of the light is opposite the above described direction, and the photoelectric conversion element 31 converts the received optical signal into an electrical signal, and outputs the electrical signal to the semiconductor circuit element 32. The semiconductor circuit element 32 amplifies this electrical signal, and outputs it via the circuit board 2 and the metal foils 51 of the supporting substrate 5 to the electronic circuit board 8.

(Functions and Advantages of the Embodiment)

The present embodiment provides the following functions and advantages.

(1) The photoelectric conversion element 31 and the semiconductor circuit element 32 are mounted on the circuit board 2, and the optical fiber 9 is held in the optical coupling member 4 sandwiched between the circuit board 2 and the supporting member 5. This eliminates the need to provide a member for holding the optical fiber 9 on the upper side of the circuit board 2 (on the opposite side to the supporting member 5), and therefore allows reducing the dimension in the thickness direction of the optical module 1.

(2) Since the optical coupling member 4 is sandwiched between the circuit board 2 and the supporting member 5, the length of the groove 401 to receive the optical fiber 9 does not directly affect the entire length of the optical module 1. That is, for example when the member for holding the optical fiber and the light receiving element or the light emitting element are parallel in the extension direction of the optical fiber as in the optical module described in JP-A-2011-95295, increasing the length for holding the optical fiber leads to correspondingly increasing the entire length of the optical module, whereas in the present embodiment, since the optical coupling member 4 and the circuit board 2 are arranged in such a manner as to overlap together in the thickness direction of the optical module 1, the optical module 1 is not large-sized, but the space for holding the optical fiber 9 can be ensured, thereby allowing securely holding the optical fiber 9.

(3) Since the photoelectric conversion element 31 and the semiconductor circuit element 32 are mounted on the same surface (the mount surface 2a) of the circuit board 2, it is possible to reduce the dimension in the thickness direction of the optical module 1, for example in comparison to when the photoelectric conversion element 31 is mounted on the mount surface 2a, and the semiconductor circuit element 32 is mounted on the back surface thereof (the non-mount surface 2b). In addition, the mounting of the photoelectric conversion element 31 and the semiconductor circuit element 32 is facilitated.

(4) Since the metal foils 51 of the supporting substrate 5 are interposed between the electrodes 222 of the circuit board 2 and the copper foils 81 of the electronic circuit board 8, connection is facilitated, for example in comparison to when the electrodes 222 and the copper foils 81 are connected directly to each other by extending solder. That is, when the spacings between the electrodes 222 and the copper foils 81 are on the order of 0.5 mm, the electrodes 222 and the copper foils 81 can be connected together by solder, but interposing the metal foils 51 therebetween allows easily and securely connecting the electrodes 222 and the copper foils 81.

(5) Since the supporting substrate 5 is produced by dicing the rod-shaped member 500, low cost production is possible, for example in comparison to when a conductor is combined with the rectangular parallelepiped insulating member.

(6) Since the body portion 50 has such translucency that the tip of the optical fiber 9 received in the groove 401 of the optical coupling member 4 is visible from the back surface 50b, it is possible to securely mount the optical fiber 9 while checking the position of the optical fiber 9.

(7) Since the metal foils 51 are exposed at the second side surface 50d and the fourth side surface 50f of the supporting substrate 5, solder connection with the copper foils 81 of the electronic circuit board 8 is facilitated. Also, after soldering the metal foils 51 and the copper foils 81, it is possible to visually check the connected states thereof.

Although the embodiment of the present invention has been described, the embodiment described above is not intended to limit the invention according to the claims. Also, it should be noted that not all the combinations of the features described in the above embodiment are essential to the means for solving the problems of the invention.

Further, the present invention may be appropriately modified and practiced without departing from the spirit thereof. For example, although in the above embodiment it has been described that one optical fiber 9 is mounted to the optical module 1, the optical module is not limited thereto, but may be configured so as to be mounted with a plurality of the optical fibers 9. In addition, the materials of each member of the optical module 1 are not limited to those described above.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
   a circuit board having a mount surface;
   a photoelectric conversion element mounted on the mount surface of the circuit board;

an optical coupling member for holding an optical fiber and optically coupling the optical fiber and the photoelectric conversion element;

a semiconductor circuit element mounted on the mount surface of the circuit board and electrically connected to the photoelectric conversion element; and a plate-shaped supporting substrate arranged to sandwich the optical coupling member between the supporting substrate and the circuit board, wherein an electrically conductive metal foil which extends in a thickness direction of the supporting substrate is provided integrally with a side surface of the supporting substrate, and the metal foil is connected at one end thereof to an electrode provided on a non-mount surface of the circuit board; and wherein the supporting substrate is formed by dicing a rod-shaped base material made of an insulation provided with an electrically conductive metal foil along a center axis at a cross section which is orthogonal to the center axis together with the metal foil.

2. The optical module according to claim 1, wherein the optical coupling member includes a groove which opens toward a supporting substrate to receive a tip of the optical fiber, and the supporting substrate sandwiches the tip of the optical fiber received in the groove between the supporting substrate and the optical coupling member.

3. The optical module according to claim 2, wherein the supporting substrate has such translucency that the tip of the optical fiber received in the groove is visible from a second plane opposite a first plane facing the optical coupling member.

4. The optical module according to claim 1, wherein the optical coupling member includes a holding body for holding the optical fiber and a light guiding body for guiding light exiting from the optical fiber.

* * * * *